US008509334B2

(12) United States Patent
Lindgren et al.

(10) Patent No.: US 8,509,334 B2
(45) Date of Patent: Aug. 13, 2013

(54) METHOD AND SYSTEM FOR PRE-CODING FOR FREQUENCY SELECTIVE RADIO COMMUNICATION CHANNEL

(75) Inventors: Ulf Lindgren, Västra Frölunda (SE); Leonid Krasny, Cary, NC (US); Henrik Sahlin, Mölnlycke (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 580 days.

(21) Appl. No.: 12/682,706

(22) PCT Filed: Oct. 15, 2007

(86) PCT No.: PCT/SE2007/000902
§ 371 (c)(1),
(2), (4) Date: Apr. 12, 2010

(87) PCT Pub. No.: WO2009/051525
PCT Pub. Date: Apr. 23, 2009

(65) Prior Publication Data
US 2010/0215113 A1    Aug. 26, 2010

(51) Int. Cl.
*H04B 7/02* (2006.01)
*H04L 27/06* (2006.01)

(52) U.S. Cl.
USPC .......................................... 375/267; 375/340

(58) Field of Classification Search
USPC ................. 375/260, 267, 295, 340, 346–350; 455/562.1, 423
See application file for complete search history.

(56) References Cited

U.S. PATENT DOCUMENTS

| | | | | |
|---|---|---|---|---|
| 6,324,220 B1 * | 11/2001 | Sellars | | 375/296 |
| 6,507,827 B1 * | 1/2003 | Benson, Jr. | | 706/14 |
| 6,680,978 B1 * | 1/2004 | Schneider et al. | | 375/242 |
| 7,430,413 B2 * | 9/2008 | Fleury et al. | | 455/423 |
| 7,483,364 B2 * | 1/2009 | Jeon et al. | | 370/203 |
| 7,974,360 B2 * | 7/2011 | Park | | 375/267 |
| 8,023,457 B2 * | 9/2011 | Kotecha et al. | | 370/329 |
| 8,023,577 B2 * | 9/2011 | Pande et al. | | 375/260 |
| 8,145,272 B2 * | 3/2012 | Wang et al. | | 455/562.1 |
| 2005/0101259 A1 | 5/2005 | Tong et al. | | |
| 2007/0149249 A1 * | 6/2007 | Chen et al. | | 455/561 |
| 2007/0160165 A1 | 7/2007 | Morgan | | |
| 2009/0060064 A1 * | 3/2009 | Futaki et al. | | 375/260 |

FOREIGN PATENT DOCUMENTS
WO   WO 2007/000622 A1   1/2007

OTHER PUBLICATIONS

U.S. Appl. No. 60/954,753, filed Aug. 8, 2007.*

(Continued)

*Primary Examiner* — Khanh C Tran
(74) *Attorney, Agent, or Firm* — Roger S. Burleigh (57) ABSTRACT

A method for processing signals to be transmitted in a MIMO system from a transmitter having at least two transmitting antennas to a receiver having at least two receiving antennas on a frequency selective communication channel. The method comprises estimating elements of a channel matrix $H(q^{-1})$ based on time delays and complex valued coefficients associated with the communication channel to provide an estimated frequency variation function of each element of the channel matrix, and pre-coding the signals to be transmitted based on the estimated frequency variation function for each element. The invention also relates to a MIMO system; and a transmitter and a receiver for use in a MIMO system.

22 Claims, 4 Drawing Sheets

(56) References Cited

OTHER PUBLICATIONS

Xia, et al. Polynomial Ambiguity Resistant Precoders (PARP) for MIMO Channels: Necessity and Sufficiency for the Blind Identifiably and PARP Characterization and Construction. Asilomar Conference on Signals, Systems and Computers. vol. 2, Oct. 29, 2000.

Liu, H et al. Precoding Techniques for Undersampled Multireceiver Communication Systems, IEEE Transactions on Signal Processing, vol. 48, No. 7, Jul. 2000.

Xia, et al. Filterbank Precoders for Blind equalization: Polynomial Ambiguity Resistant Precoders (PARP), IEEE Transactions on Circuits and Systems, vol. 48, No. 2, Feb. 2001.

Chen, et al. Precoded FIR and Redundant V-Blast Systems for Frequency-Selective MIMO Channels, IEEE Transactions on Signal Processing, vol. 55, No. 7, Jul. 2007.

* cited by examiner

METHOD AND SYSTEM FOR PRE-CODING FOR FREQUENCY SELECTIVE RADIO COMMUNICATION CHANNEL

TECHNICAL FIELD

The present invention relates to a method for pre-coding in communication systems over a frequency selective communication channel using a system function approach, preferably used in a wireless communication system. The invention also relates to a system.

BACKGROUND

An optimal transmission of several data streams, Multiple Input Multiple Output (MIMO), is based on using antenna elements for which a pre-coding by a set of weights is used per stream. The pre-coding can be regarded as if each stream is subject to a beamformer, and where all streams are transmitted simultaneously. The beamforming coefficients depend on the radio communication channel, because the optimal weights are the eigenvectors calculated by e.g. Singular Value Decomposition (SVD) of the channel matrix. A physical interpretation of the obtained weights is an antenna pattern. This antenna pattern describes how energy is radiated in directions which match the clusters that best transfer the energy to a receiver.

In $3^{rd}$ Generation Partnership Project (3GPP), the concept of pre-coding is used, as disclosed in 3GPP TS 36.211 (reference [1]). In version 1.1.1 of reference [1], the standard covers a primitive version of pre-coding that contains a very limited number of distinct settings. These settings are described both using a one and a two antenna port scenario. The description in reference [1] is, from an antenna domain scenario, a method for creating beamforming coefficients for enumerated sets.

The radio communication channel is often modelled as consisting of clusters. These clusters are modelled as a collection of scatterers, and the scattering is what mediates the radio wave. The channel depends on the impact of clusters, for example, the number of objects and their positions. In the context of the present invention it is important to recognize that the impact of the clusters is a function of carrier frequency. This means that the radio wave excites different physical objects depending of frequency. The channel perceived at, for example, a mobile station will exhibit a frequency dependence which is related to the clusters excited by the base station and vice versa. In the antenna domain, the frequency dependence has to be incorporated in a discussion on optimality.

In addition to the antenna domain, a radio communication link often features an equalizer at the receiver side. The purpose of such a device is to mitigate the effect of Inter Symbol Interference (ISI) due to the channel delay spread, e.g. the joint delay effect of propagation in the channel. Typically, the equalizer does not discriminate on clusters having the same delay but different spatial location. This implies that the equalizer can be viewed as operating in the temporal domain.

An observation which is of interest is that the pre-coding is described by the standard in reference [1] with a code book approach. The pre-coding is chosen as one out of a limited set of settings, such that the pre-coding coefficients are coarsely quantized in the spatial domain. Here, the weights can be regarded as means to separate the data streams at the receiver. In this context, the communication channel acts as a separation structure in a source separation problem (e.g. see reference [2]).

In US 2005/0101259 (reference [3]), by Tong et al., a method for transmission signal processing is disclosed. Pre-coding signal weights are determined based on CSI (channel state information) associated with several communication channels. Various techniques for determining CSI are disclosed including scattered pilot tones in OFDM systems. A matrix is used for pre-coding and an inverse matrix is used when decoding the received signals in the receiver. The described system handles a case with no delays and a frequency flat channel, wherein no variations in frequency is allowed.

A drawback with the prior art is that pre-coding for a frequency selective channel, i.e. a channel which is not flat, may not be accomplished. A prior art concept to handle a frequency selective channel is based on a set of elements being complex matrices. These elements are weights to be used as pre-coding of an Orthogonal Frequency Division Multiple (OFDM) symbol. An OFDM symbol may be considered to be a collection of sub-carriers, e.g. the frequency bins of a Discrete Fourier Transform (DFT), see reference [4]. The idea is that the matrix operates on a sub-carrier and its closest neighbours, with the rational that the channel is flat in this small interval. Obviously, the number of matrices needed must be sufficiently many in order to describe the whole channel.

In a Frequency Division Duplex (FDD) system, the channel is not reciprocal, therefore a feedback is needed. That is, if A is transmitting to B then B must inform A of the seen channel at B's position, and vice versa. Using a large number of matrices causes the feedback to become significant. Hence, the bandwidth efficiency decreases.

The number of matrices used to pre-code data may become quite large in order to model a frequency selective channel. This makes the system feedback large which is undesired. Moreover, the number of possible weights are few, when a code book based pre-coding is used, and this results in a poor match for an arbitrary channel.

SUMMARY OF THE INVENTION

An object with the present invention is to provide a method for pre-coding a frequency selective radio communication channel with improved bandwidth efficiency compared to prior art solutions.

This object is achieved by a method for processing signals to be transmitted in a MIMO system. The MIMO system has, in it simplest configuration, a transmitter with at least two transmitting antennas and a receiver with at least two receiving antennas. More transmitting and/or receiving antennas may be provided in the MIMO system. The signals are transmitted from the transmitter to the receiver on a frequency selective communication channel, i.e. a non-flat channel. A channel matrix, i.e. the channel transfer function, is estimated based on measured time delays and complex valued coefficients in the communication channel in order to estimate functions describing the frequency variation of the received signal in the receiver. The signals to be transmitted is thereafter pre-coded (or pre-distorted) based on the estimated functions to obtain a low inter stream interference and a known symbol distortion (or even no symbol distortion).

An advantage with the present invention is that information regarding the channel frequency variations is used to pre-code the transmitted signals, whereby less information needs to be transmitted from the receiver to the transmitter since the frequency variations may be expressed as a mathematical expression needing less bandwidth.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

The general concept of the invention is to pre-distort a communication signal such that when it is received at a user receiver it has 1) a low inter stream interference; 2) a known symbol distortion or no symbol distortion. The communication channel is modelled as a set of Finite Impulse Response (FIR) filters instead of using the channel frequency gain function. These filters are used to pre-code the antenna signals (in time or frequency). In a Time Division Duplex (TDD) system, the communication channel might be reciprocal such that no feedback is needed. However, sometimes it is beneficial to feedback the pre-coding coefficients for TDD systems, e.g. if transmitter or receiver hardware has a large unknown impact on the channel. For a FDD system these filters are fed back to the transmitter, preferably truncated to two or three coefficients. In the two antenna case, the communication channel may be described by the following transfer function (or channel matrix):

$$H(q^{-1}) = \begin{bmatrix} H_{11}(q^{-1}) & H_{12}(q^{-1}) \\ H_{21}(q^{-1}) & H_{22}(q^{-1}) \end{bmatrix} \quad (1)$$

where $q^{-1}$ is the unit delay operator. The elements of the channel matrix $H(q^{-1})$ are FIR filters, which is a most realistic model for a radio communication channel.

Each FIR filter $$H_{nm}(q^{-1}) = \sum_{k=L_{min}}^{L_{max}} h_{k,nm} q^{-k},$$

where $h_{k,nm}$ is a complex valued coefficients for element nm and $q^{-k}$ represents time delays. The summation limits $L_{min}$, $L_{max}$ are preferably selected by model order selection methods, e.g Aikake, see reference [5].

Figure 1:
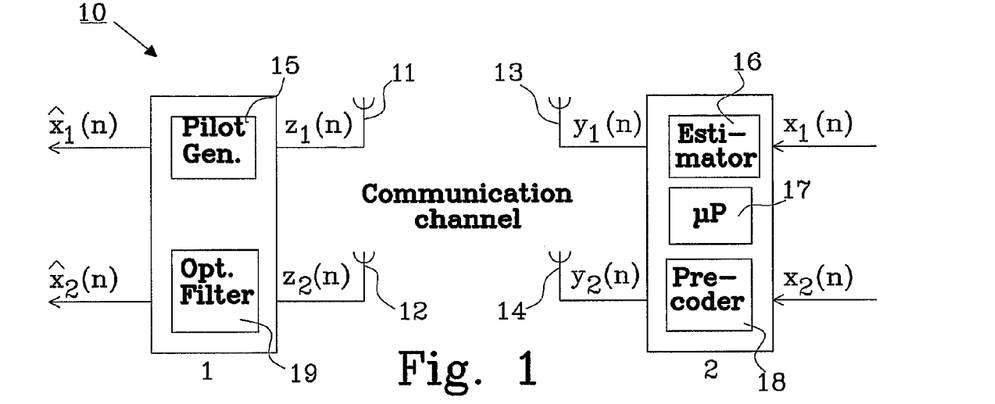
FIG. 1 shows a first embodiment of the present invention in a TDD system.

FIG. 1 shows a first embodiment of the present invention in a TDD system (i.e. when no feedback required). The MIMO system 10 comprises a first transceiver 1 having two antennas 11 and 12, and a second transceiver 2 having two antennas 13 and 14. The transceiver 1 is provided with a pilot signal generator 15 that transmits pilot signals to the transceiver 2 using the antennas 11 and 12. The pilot signals are received at the antennas 13 and 14 of the transceiver 2 and elements in a 2 by 2 channel matrix for the communication channel are estimated in the estimator 16 based on delays associated with the communication channel to provide an estimated frequency variation function of each element of the channel matrix. A calculator unit 17 in the transceiver 2 is used to calculate a 2 by 2 pre-coding matrix based on the estimated frequency variation function for each element of the channel matrix in order to pre-code the signals to be transmitted in a pre-coder 18. The function of the calculator unit 17 is described in more detail below, and the pre-coder is preferably implemented as FIR filters. Data streams $x_1(n)$ and $x_2(n)$ are fed to the transceiver 2 and pre-coded in the pre-coder 18 before the pre-coded signals are transmitted from the antennas 13 and 14 of the transceiver 2. These signals are thereafter received at the antennas 11 and 12 of the transceiver 1 and filtered in an optional filter 19 before estimated data streams $\hat{x}_1(n)$ and $\hat{x}_2(n)$ are outputted from the transceiver 1 for further processing.

It should be noted that the transceiver 1 is also equipped with an estimator, calculator unit and pre-coder for transmitting data to the transceiver 2, which is also equipped with a pilot generator to transmit pilot signals to the transceiver 1 and optionally a filter to be able to receive data signals from the transceiver 1. These are omitted from the drawing for the sake of clarity.

Figure 2:
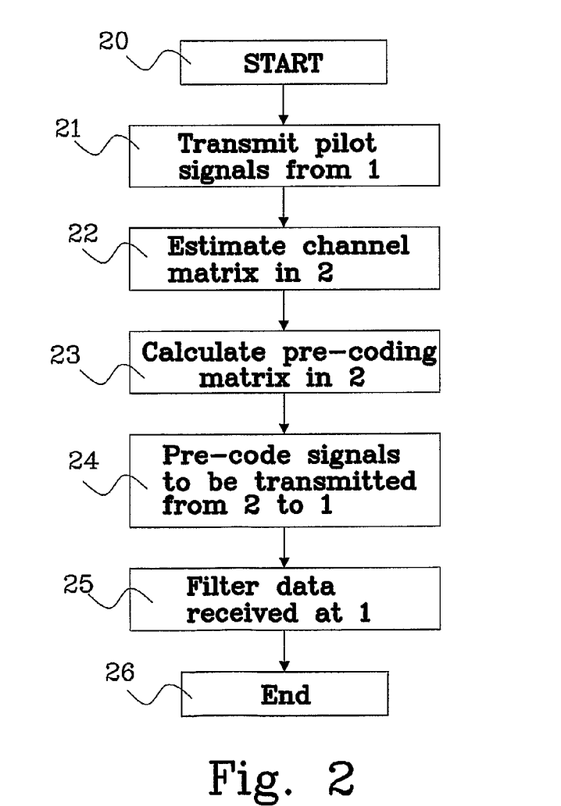
FIG. 2 shows a flow chart illustrating the operation in a TDD system according to FIG. 1.

FIG. 2 shows a flow chart illustrating the operation in a TDD system according to FIG. 1. The flow starts at step 20, and pilot signals are transmitted from a first transceiver (e.g. transceiver 1) in step 21. The pilot signals are received at a second transceiver (e.g. transceiver 2) and the elements of the channel matrix are estimated in step 22 to provide an estimated frequency variation function of each element of the channel matrix. A pre-coding matrix is calculated at step 23, and data streams $x_1(n)$ and $x_2(n)$ intended to be transmitted from the second transceiver 2 are pre-coded based on the estimated frequency variation function for each element in the channel matrix at step 24. Signals $z_1(n)$ and $z_2(n)$ are received at the first transceiver 1 and are filtered at step 25 to output estimated data streams $\hat{x}_1(n)$ and $\hat{x}_2(n)$ from the first transceiver 1 for further processing. The flow ends at step 26. It should be noted that step 25 is optional, see below.

Figure 3:
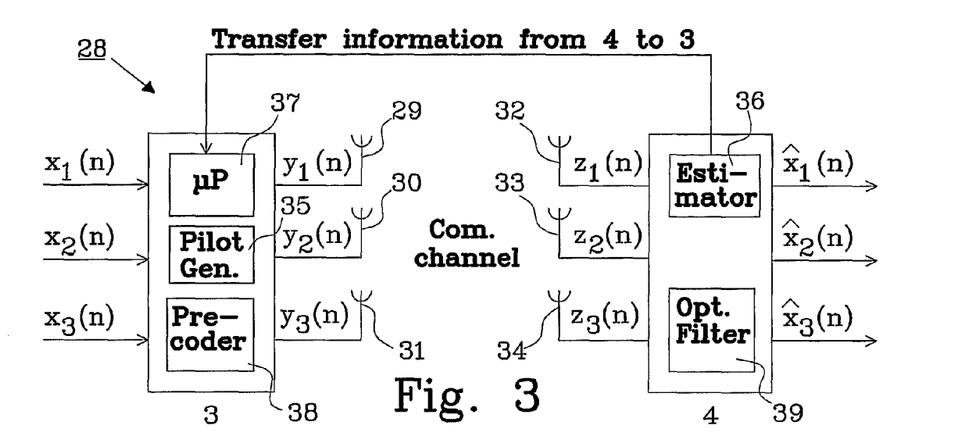
FIG. 3 shows a first embodiment of the present invention in a FDD system.

FIG. 3 shows a second embodiment of the present invention in a FDD system (feedback required). The MIMO system 28 comprises a transmitter 3 having three antennas 29, 30 and 31, and a receiver 4 having three antennas 32, 33 and 34. The transmitter 3 is provided with a pilot signal generator 35 that transmits pilot signals to the receiver 4 using the antennas 29-31. The pilot signals are received at the antennas 32-34 of the receiver 4 and elements in a 3 by 3 channel matrix for the communication channel are estimated in the estimator 36 based on delays associated with the communication channel to provide an estimated frequency variation function of each element of the channel matrix. Information regarding the estimated frequency variation functions is transferred from the receiver 4 to the transmitter 3. A calculator unit 37 in the transmitter 3 is used to calculate a 3 by 3 pre-coding matrix based on the estimated frequency variation function for each element of the channel matrix in order to pre-code the signals to be transmitted in a pre-coder 38. The function of the calculator unit 37 is described in more detail below, and the pre-coder is preferably implemented as FIR filters. Alternatively, the pre-coding matrix is calculated in the receiver based on delays associated with the communication channel, and this pre-coding matrix is then transferred to the transmitter, i.e. from 4 to 3. Data streams $x_1(n)$, $x_2(n)$ and $x_3(n)$ are fed to the transmitter 3 and pre-coded in the pre-coder 38 before the pre-coded signals are transmitted from the antennas 29-31 of the receiver 4 over a communication channel. These signals are thereafter received at the antennas 32-34 of the transmitter A and filtered in an optional filter 39 before estimated data streams $\hat{x}_1(n)$, $\hat{x}_2(n)$ and $\hat{x}_3(n)$ are outputted from the receiver 4 for further processing.

Figure 4:
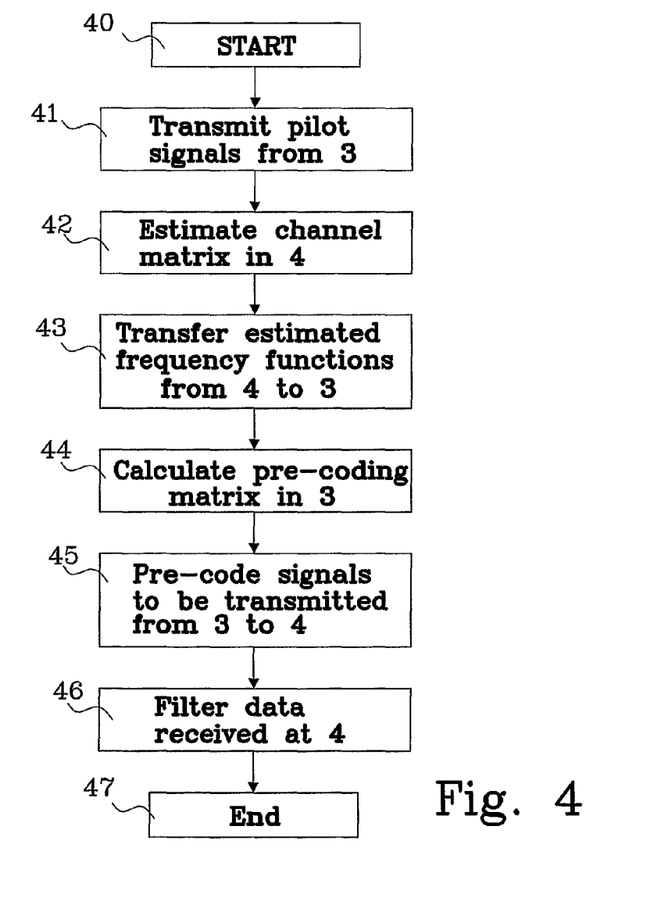
FIG. 4 shows a flow chart illustrating the operation in a FDD system according to FIG. 3.

FIG. 4 shows a flow chart illustrating the operation in a FDD system according to FIG. 3. The flow starts at step 40, and pilot signals are transmitted from a transmitter 3 in step 41. The pilot signals are received at a receiver 4 and the elements of a 3×3 channel matrix are estimated in step 42 to provide an estimated frequency variation function of each element of the channel matrix. Information regarding the estimated frequency variation functions is transferred from the receiver 4 to the transmitter 3 in step 43, and a 3×3 pre-coding matrix is calculated in step 44, and data streams $x_1(n)$, $x_2(n)$ and $x_3(n)$ intended to be transmitted from the transmitter 3 are pre-coded based on the estimated frequency variation function for each element in the channel matrix at step 45. Signals $z_1(n)$, $z_2(n)$ and $z_3(n)$ are received at the receiver 4 and are filtered at step 46 to output estimated data streams $\hat{x}_1(n)$, $\hat{x}_2(n)$ and $\hat{x}_3(n)$ from the receiver 4 for further processing. The flow ends at step 47. It should be noted that step 46 is optional, see below.

In the embodiments described above, the same number of antennas at both transmitter and receiver are selected. The reason for doing this is that the number of data streams that may be transferred between the transmitter and the receiver in limited to the minimum number of antennas at both the transmitter and the receiver, i.e. min (N, M), where N is the number of transmitting antennas and M is the number of receiving antennas.

It should be noted that the pre-coding matrix $W(q^{-1})$ may be calculated in the receiver and thereafter transferred to the transmitter to pre-code the signals to be transmitted.

Figure 5A:
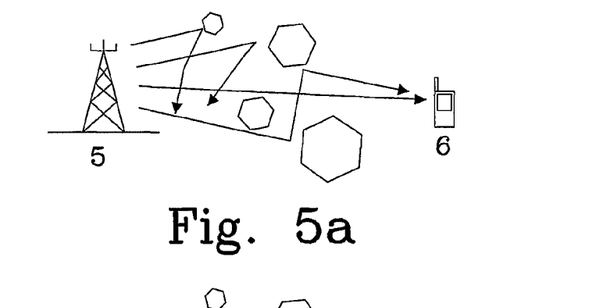
FIGS. 5a-5c illustrate a preferred embodiment of estimating the elements of the channel matrix.
Figure 5B:
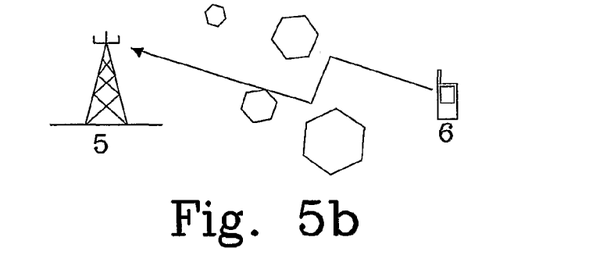
Figure 5C:
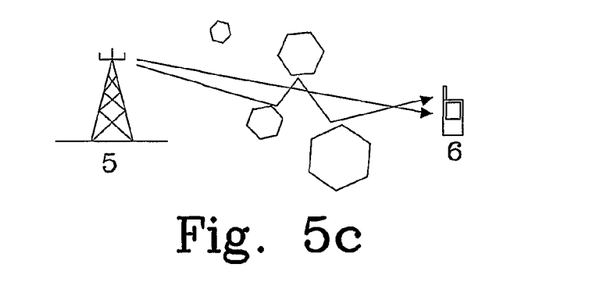

FIGS. 5a-5c illustrate a preferred embodiment for estimating the elements of the channel matrix. A transmitter 5 sends pilot signals which a receiver 6 uses to estimate the channel model in the receiver 6, as illustrated in FIG. 5a. This channel model is a N by M matrix with FIR filters as elements, where N is the number of transmitting antennas and M is the number of receiving antennas. The matrix elements are quantized such that each element being expressed as a polynomial, containing a few coefficients. The number of coefficients to be transmitted can, for example, be determined by model order selection methods, e.g. Aikake Information Criterion (AIC) (see reference [5]). The polynomials are transmitted from 6 to 5 as illustrated in FIG. 5b. Now the transmitter 5 knows what channel the receiver 6 experiences. Based on these polynomials a pre-coding matrix is calculated and used to pre-code the data transmitted from 5 as illustrated in FIG. 5c. The pre-coding can take place in the time domain or in the frequency domain. A polynomial representation is a parametric representation of the frequency domain. A clear advantage is that instead of having several piecewise constant weights, a continuous function defining the proper pre-coding is obtained.

Figure 6:
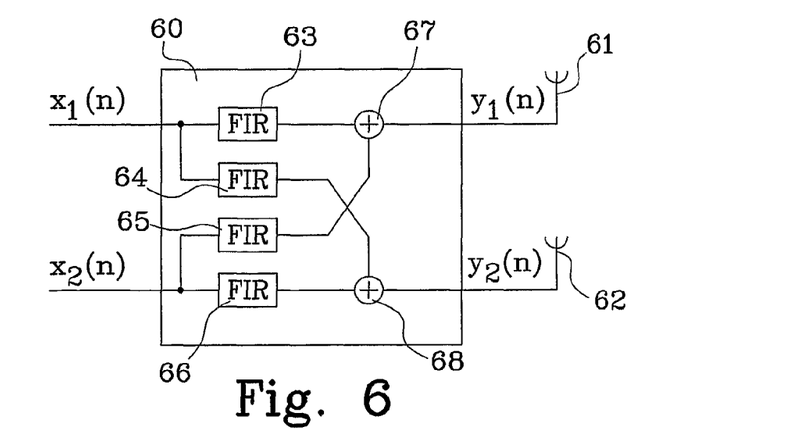
FIG. 6 shows an example of a pre-coding structure for a two antenna case.

FIG. 6 shows one proposed pre-coding structure for the two antenna case. Two independent data streams $x_1(n)$ and $x_2(n)$ are fed into the pre-coding structure 60, and two transmit signals $y_1(n)$ and $y_2(n)$ are fed to a respective transmitting antenna 61, 62. Four FIR filters 63-66 and two summation circuits 67 and 68 are arranged within the pre-coding structure 60. A first data stream $x_1(n)$ is connected to a first FIR filter 63 and a second FIR filter 64, and a second data stream $x_2(n)$ is connected to a third FIR filter 65 and a fourth FIR filter 66. Each FIR filter is configured to provide a proper pre-coding of the data streams $x_1(n)$ and $x_2(n)$ together with the summation circuits 67 and 68. The outputs of the first and third FIR-filter are connected to a first summation circuit 67 to produce the first transmit signal $y_1(n)$, and the outputs of the second and fourth FIR filter are connected to a second summation circuit 68 to produce the second transmit signal $y_2(n)$.

The FIR filter may be configured based on the channel matrix estimate or on eigenvector functions as illustrated below.

Pre-Coding Based on Channel Estimates

An inverse of the channel matrix may be used to pre-code the data streams before they are transmitted. The FIR representation in FIG. 6 results in the following matrix representation first FIR filter (63): $W_{11}(q^{-1})$
second FIR filter (64): $W_{21}(q^{-1})$
third FIR filter (65): $W_{12}(q^{-1})$
fourth FIR filter (66): $W22(q^{-1})$
Each FIR filter $$W_{nm}(q^{-1}) = \sum_{k=K_{min}}^{K_{max}} a_{k,nm} q^{-k},$$

where $\alpha_{k,nm}$ is a complex valued coefficients for element nm and $q^{-k}$ represents time delays. The interval $K_{min}, K_{max}$ is preferably selected to be a sub-set of the interval $L_{min}, L_{max}$.

$$W(q^{-1}) = \begin{bmatrix} W_{11}(q^{-1}) & W_{12}(q^{-1}) \\ W_{21}(q^{-1}) & W_{22}(q^{-1}) \end{bmatrix} \quad (2)$$

Multiplying Eq. (1) and Eq. (2) yields the matrix $$P(q^{-1}) = \begin{bmatrix} W_{11}(q^{-1})H_{11}(q^{-1}) + W_{21}(q^{-1})H_{12}(q^{-1}) & H_{11}(q^{-1})W_{12}(q^{-1}) + H_{12}(q^{-1})W_{22}(q^{-1}) \\ H_{21}(q^{-1})W_{11}(q^{-1}) + H_{22}(q^{-1})W_{21}(q^{-1}) & H_{21}(q^{-1})W_{12}(q^{-1}) + H_{22}(q^{-1})W_{22}(q^{-1}) \end{bmatrix} \quad (3)$$

Selecting the pre-coding filters according to:

$W_{11}(q^{-1}) = H_{22}(q^{-1})$, $W_{22}(q^{-1}) = H_{11}(q^{-1})$, $W_{12}(q^{-1}) = -H_{12}(q^{-1})$, and $W_{21}(q^{-1}) = -H_{21}(q^{-1})$ results in a diagonal matrix $P(q^{-1})$ with $\det(H(q^{-1}))$ on the diagonal. Evidently, the two data streams are separated, but filtered by $\det(H(q^{-1}))$, which is a minor issue since that filter is known. In fact, the filter can also be avoided by pre-filtering the data streams by $(\det(H(q^{-1})))^{-1}$, either in the transmitter before being transmitted to the receiver, or in a filter in the receiver before the signal is decoded. The selection corresponds to the inverse of Eq. (1) which is rather natural. This also means that the result is general for any number of antennas. That is, the elements of the pre-coding matrix should be chosen as the channel matrix determinant times the cofactors of the inverse of the channel matrix.

Figure 7:
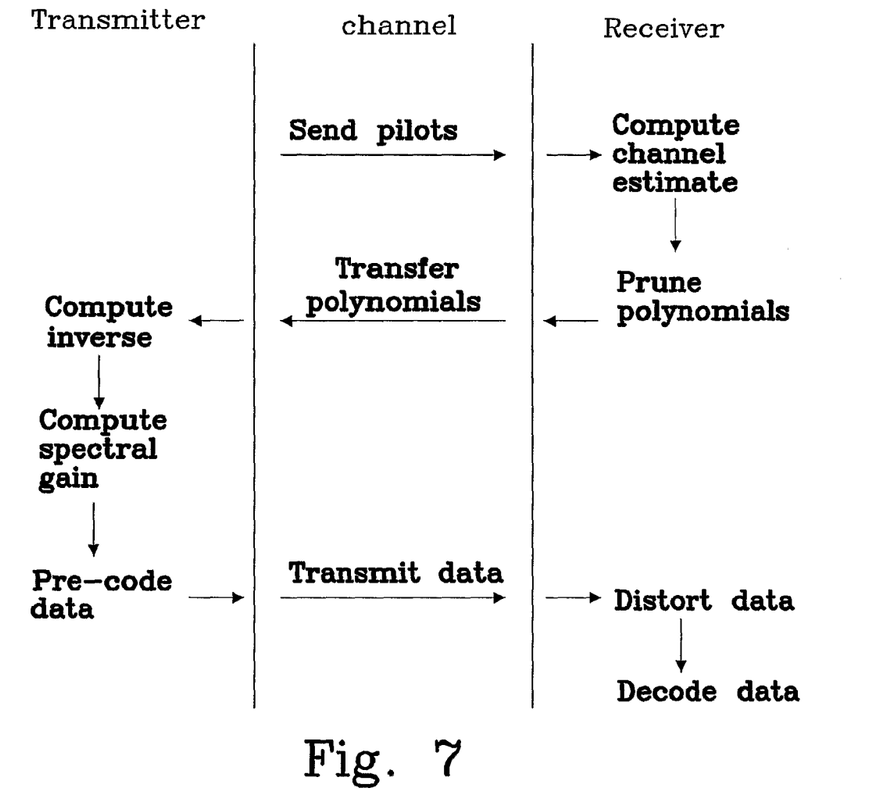
FIG. 7 shows a flow diagram that illustrates a preferred embodiment of a method according to the invention.

FIG. 7 shows a flow diagram that illustrates a preferred embodiment of a method according to the invention based on the inverse calculation of the channel matrix to obtain the pre-coding matrix.

Pilot signals are generated and transmitted from the transmitter to the receiver. The channel matrix estimate is calculated based on the received pilot signals in the receiver, and polynomials are pruned according to some penalty function, e.g. AIC. The polynomials are thereafter transmitted to the transmitter, and an inverse of the channel matrix is computed in terms of cofactors. The spectral gain for each sub-carrier in an OFDM system is computed using the parametric model in the transmitter, and the gains are applied to the data (pre-coding) and the pre-coded data are thereafter transmitted to the receiver. The received data is distorted by $(\det(H(q^{-1})))^{-1}$, i.e. one over the channel-matrix determinant, and may thereafter be decoded.

Figure 8:
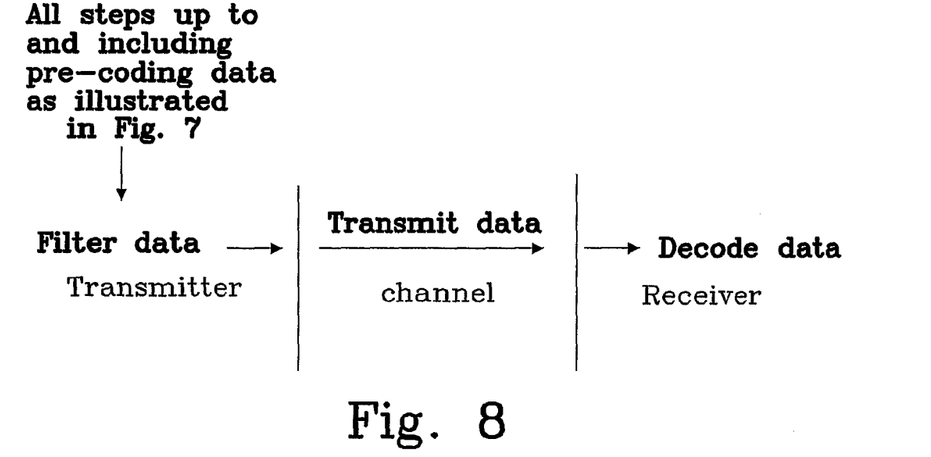
FIG. 8 shows an alternative flow diagram of the embodiment shown in FIG. 7.

FIG. 8 shows an alternative flow diagram in which all steps including the pre-coding step is performed as illustrated in FIG. 7. Filtering by $(\det(H(q^{-1})))^{-1}$, i.e. one over the channel matrix determinant is performed, in the transmitter before transmitting the pre-coded data to the receiver. In that case, the received data may be decoded without any additional filtering.

The polynomials represent the frequency variation functions upon which the pre-coding matrix is calculated. However, it is preferred that a limited number of coefficients, e.g. 3-4, in the polynomials are transmitted from the receiver to the transmitter in order to minimize the bandwidth needed to transfer information regarding the frequency variation functions. The channel matrix needs to be estimated at regular intervals to monitor changes in the communication channel, especially in the case where the transmitter and/or receiver is a mobile station and not part of the stationary communication network, see FIG. 5a-5c.

Pre-Coding Based on Eigenvector Functions

In the prior art, it was mentioned that the optimal weights are those related to the eigenvectors of the channel matrix. Typically, this is described and derived for a flat channel, but in the present invention the concept is extended to frequency selective channels.

The communication channel, for the two antenna case, is given by Eq. (1), and Eigen value functions can be calculated by evaluating:

$$|H(q^{-1}) - \lambda(q^{-1})I| = 0, \quad (4)$$

Where the Eigen value functions becomes $$\lambda(q^{-1}) = \frac{H_{11}(q^{-1}) + H_{22}(q^{-1})}{2} \pm \sqrt{\left(\frac{H_{11}(q^{-1}) - H_{22}(q^{-1})}{2}\right)^2 + H_{12}(q^{-1})H_{21}(q^{-1})} \quad (5)$$

The eigenvector function $v(q^{-1})$ can be found from the following expression:

$$H(q^{-1})v(q^{-1}) = \lambda(q^{-1})v(q^{-1}) \quad (6)$$

The two antenna case evaluates for example to:

$$v_1(q^{-1}) = \begin{bmatrix} v_{11}(q^{-1}) \\ v_{12}(q^{-1}) \end{bmatrix} = \begin{bmatrix} -\frac{H_{11}(q^{-1}) - H_{22}(q^{-1})}{2} + \\ \frac{H_{12}(q^{-1})}{\sqrt{\left(\frac{H_{11}(q^{-1}) - H_{22}(q^{-1})}{2}\right)^2 + H_{12}(q^{-1})H_{21}(q^{-1})}} \end{bmatrix} \quad (7)$$

and $$v_2(q^{-1}) = \begin{bmatrix} v_{21}(q^{-1}) \\ v_{22}(q^{-1}) \end{bmatrix} = \begin{bmatrix} -\frac{H_{11}(q^{-1}) - H_{22}(q^{-1})}{2} + \\ \frac{H_{12}(q^{-1})}{\sqrt{\left(\frac{H_{11}(q^{-1}) - H_{22}(q^{-1})}{2}\right)^2 + H_{12}(q^{-1})H_{21}(q^{-1})}} \end{bmatrix} \quad (8)$$

Equations (7) and (8) can be transformed into a frequency domain representation simply by substituting $q^k = e^{j\omega k}$, where $\omega$ is frequency. Obviously, a frequency representation can for example be used to optimally weight an OFDM symbol.

It is an advantage that a typical channel can be modelled with a few time delays and complex valued coefficients. Hence, instead of transmitting a large amount of frequency weights, a time domain model is transmitted. This model may, at the receiver, be used in the time or frequency domain. The point is that a large reduction in amount of required feedback can be made.

The calculator unit 17 and 37, previously described in connection with FIGS. 1 and 3, are configured to calculate the pre-coding matrix $W(q^{-1})$ based on the estimated frequency variation function for each element of the channel matrix $H(q^{-1})$, i.e. based on the inverse of the channel matrix or eigenvector functions of the channel matrix, in order to pre-code the signals to be transmitted.

Abbreviations
3GGP 3$^{rd}$ Generation Partnership Project
AIC Akaike Information Criterion
DTF Discrete Fourier Transform
FDD Frequency Division Duplex
FIR Finite Impulse Response
ISI Inter Symbol Interference
LTE Long Term Evolution
MIMO Multiple Input Multiple Output
OFDM Orthogonal Frequency Division Multiplex
SVD Singular Value Decomposition
TDD Time Division Duplex

REFERENCES

[1] 3$^{rd}$ Generation Partnership Project, 650 Route des Lucioles, Sophia Antipolis, Valbonne FRANCE, "Technical Specification Group Radio Access Network; Physical Channels and Modulation"; 3GGP TS 36.211, v1.1.1 edition, 2007.

[2] U. Lindgren and H. Broman. "Source separation: Using a criterion based on second order statistics", IEEE Trans. on Signal Processing, 46(7), July 1998.

[3] US 2005/0101259, Tong et al. "Communication channel optimization systems and methods in multi-user communication systems", May 12, 2005.

[4] H. Schulze and C. Lüders. "Theory and applications of OFDM and CDMA wideband wireless communications", John Wiley 85 Sons Inc., Chichester, West Sussex PO19 8SQ, England, 2005.

[5] P. Stocia and Y Selen. Model-order selection a review of information criterion rules. IEEE Signal Processing Magazine, pages 36-47, July 2004.

The invention claimed is:

1. A method for processing signals to be transmitted in a Multiple Input Multiple Output (MIMO) system from a transmitter having at least two transmitting antennas to a receiver having at least two receiving antennas on a frequency selective communication channel, comprising the steps of:
   estimating elements of a channel matrix $H(q^{-1})$ in the receiver based on time delays and complex valued coefficients associated with the communication channel to provide an estimated frequency variation function of each element of the channel matrix $H(q^{-1})$;
   transferring the estimated frequency variation function from the receiver to the transmitter; and
   pre-coding the signals to be transmitted based on the estimated frequency variation function for each element of the channel matrix $H(q^{-1})$.

2. The method according to claim 1, wherein the method further comprises the step of calculating a pre-coding matrix $W(q^{-1})$ based on the estimated frequency variation function for each element of the channel matrix $H(q^{-1})$ to pre-code the signals to be transmitted.

3. The method according to claim 2, further comprising the step of implementing the pre-coding matrix $W(q^{-1})$ as Finite Impulse Response (FIR) filters in the transmitter.

4. The method according to claim 2, wherein the elements of the channel matrix $H(q^{-1})$ are estimated by:
   transmitting pilot signals from the transmitter to the receiver;
   estimating the elements of the channel matrix $H(q^{-1})$ in the receiver based on the pilot signals;
   quantizing each element of the channel matrix $H(q^{-1})$ to obtain a polynomial having a predetermined number of coefficients representing each estimated frequency variation function; and
   using the polynomials to calculate the pre-coding matrix $W(q^{-1})$.

5. The method according to claim 2, wherein the pre-coding matrix $W(q^{-1})$ represents an inverse of the channel matrix $H(q^{-1})$.

6. The method according to claim 2, wherein the pre-coding matrix $W(q^{-1})$ represents eigenvector functions of the channel matrix $H(q^{-1})$.

7. The method according to claim 1, wherein the MIMO system is an Orthogonal Frequency Division Multiplexing (OFDM) system.

8. The method according to claim 1, further comprising pre-coding in the time domain or in the frequency domain.

9. A Multiple Input Multiple Output (MIMO) system having a transmitter having at least two transmitting antennas and a receiver having at least two receiving antennas, the MIMO system being configured to process signals to be transmitted from the transmitter to the receiver on a frequency selective communication channel, the MIMO system comprising:
   an estimator in the receiver configured to estimate elements in a channel matrix $H(q^{-1})$ based on time delays and complex valued coefficients associated with the communication channel to provide an estimated frequency variation function of each element of the channel matrix $H(q^{-1})$;
   means to transfer the estimated frequency variation function from the receiver to the transmitter; and
   a pre-coder configured to pre-code the signals to be transmitted based on the estimated frequency variation function for each element of the channel matrix $H(q^{-1})$.

10. The MIMO system according to claim 9, wherein the MIMO system is provided with a calculator unit configured to calculate a pre-coding matrix $W(q^{-1})$ based on the estimated frequency variation function for each element of the channel matrix $H(q^{-1})$ to pre-code the signals to be transmitted.

11. The MIMO system according to claim 10, wherein the pre-coder is implemented as Finite Impulse Response (FIR) filters representing the pre-coding matrix $W(q^{-1})$.

12. The MIMO system according to claim 10, wherein the transmitter is configured to transmit pilot signals to the receiver and the estimator of the receiver is configured to estimate the elements of the channel matrix $H(q^{-1})$ based on the pilot signals, and quantize each element of the channel matrix $H(q^{-1})$ to obtain a polynomial having a predetermined number of coefficients representing each estimated frequency variation function, the polynomials being used in the calculator unit of the transmitter to calculate the pre-coding matrix $W(q^{-1})$.

13. The MIMO system according to claim 10, wherein the calculator unit is configured to calculate the pre-coding matrix $W(q^{-1})$ as an inverse of the channel matrix $H(q^{-1})$.

14. The MIMO system according to claim 10, wherein the calculator unit is configured to calculate the pre-coding matrix $W(q^{-1})$ based on eigenvector functions of the channel matrix $H(q^{-1})$.

15. The MIMO system according to claim 9, wherein the MIMO system is an Orthogonal Frequency Division Multiplexing (OFDM) system.

16. The MIMO system according to claim 9, wherein the pre-coder operates in the time domain or the frequency domain.

17. A transmitter configured to communicate with a receiver in a Multiple Input Multiple Output (MIMO) system on a frequency selective communication channel, the transmitter having at least two transmitting antennas and configured to process signals to be transmitted to the receiver, the transmitter comprising:
   a pre-coder configured to pre-code the signals to be transmitted based on an estimated frequency variation function for each element in a channel matrix $H(q^{-1})$ estimated in and received from the receiver.

18. The transmitter according to claim 17, wherein the transmitter further comprises a calculator unit configured to calculate a pre-coding matrix $W(q^{-1})$ based on the estimated frequency variation function for each element of the channel matrix $H(q^{-1})$ to pre-code the signals to be transmitted.

19. The transmitter according to claim 18, wherein the pre-coder is implemented as Finite Impulse Response (FIR) filters representing the pre-coding matrix $W(q^{-1})$.

20. The transmitter according to claim 18, wherein the calculator unit is configured to calculate the pre-coding matrix $W(q^{-1})$ as an inverse of the channel matrix $H(q^{-1})$, or eigenvector functions of the channel matrix $H(q^{-1})$.

21. A receiver configured to communicate with a transmitter in a Multiple Input Multiple Output (MIMO) system on a frequency selective communication channel, the receiver having at least two receiving antennas, the receiver comprising an estimator configured to estimate elements in a channel matrix $H(q^{-1})$ based on time delays and complex valued coefficients associated with the communication channel to provide an estimated frequency variation function of each element of the channel matrix $H(q^{-1})$ and means to communicate the estimated frequency variation function to the transmitter.

22. The receiver according to claim 21, wherein the receiver further comprises means to receive pilot signals from the transmitter, and the estimator of the receiver is configured to estimate the elements of the channel matrix $H(q^{-1})$ based on the pilot signals; and quantize each element of the channel matrix $H(q^{-1})$ to obtain a polynomial having a predetermined number of coefficients representing each estimated frequency variation function, the polynomials are communicated to the transmitter.

* * * * *

UNITED STATES PATENT AND TRADEMARK OFFICE
CERTIFICATE OF CORRECTION

PATENT NO. : 8,509,334 B2  Page 1 of 1
APPLICATION NO. : 12/682706
DATED : August 13, 2013
INVENTOR(S) : Lindgren et al.

It is certified that error appears in the above-identified patent and that said Letters Patent is hereby corrected as shown below:

In the Specification

In Column 9, Line 3, delete "John Wiley 85 Sons Inc.," and
insert -- John Wiley & Sons Inc., --, therefor.

Signed and Sealed this
Twenty-fifth Day of March, 2014

Michelle K. Lee
*Deputy Director of the United States Patent and Trademark Office*